US011052776B2

(12) United States Patent
Christen et al.

(10) Patent No.: US 11,052,776 B2
(45) Date of Patent: Jul. 6, 2021

(54) CHARGING STATION FOR ELECTRIFIED VEHICLES

(71) Applicant: FORD GLOBAL TECHNOLOGIES, LLC, Dearborn, MI (US)

(72) Inventors: Erik J. Christen, Royal Oak, MI (US); Matthew Fleming, Dearborn, MI (US); Ray C. Siciak, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1186 days.

(21) Appl. No.: 14/863,482

(22) Filed: Sep. 24, 2015

(65) Prior Publication Data

US 2017/0088005 A1    Mar. 30, 2017

(51) Int. Cl.
| | | |
|---|---|---|
| *B60L 11/18* | (2006.01) | |
| *B60L 53/14* | (2019.01) | |
| *B60L 53/10* | (2019.01) | |
| *B60L 58/26* | (2019.01) | |
| *B60L 53/302* | (2019.01) | |

(52) U.S. Cl.
CPC ........... *B60L 53/14* (2019.02); *B60L 11/1874* (2013.01); *B60L 53/11* (2019.02); *B60L 53/302* (2019.02); *B60L 58/26* (2019.02); *Y02T 10/70* (2013.01); *Y02T 10/7072* (2013.01); *Y02T 90/12* (2013.01); *Y02T 90/14* (2013.01); *Y02T 90/16* (2013.01)

(58) Field of Classification Search
CPC .. B60L 11/1874; B60L 11/185; B60L 11/1186
USPC ....................................................... 320/109
See application file for complete search history.

(56) References Cited

U.S. PATENT DOCUMENTS

| | | | | |
|---|---|---|---|---|
| 4,007,315 | A | * | 2/1977 | Brinkmann .............. B60K 1/04 429/62 |
| 4,102,152 | A | * | 7/1978 | Covault .................. F25B 39/04 165/170 |
| 5,145,581 | A | * | 9/1992 | Novy ..................... B01D 53/85 210/609 |
| 7,868,588 | B2 | | 1/2011 | Altekruse et al. |
| 8,350,526 | B2 | | 1/2013 | Dyer et al. |
| 8,893,522 | B2 | | 11/2014 | Jojima |
| 2005/0172660 | A1 | * | 8/2005 | Anderson ............... F25D 16/00 62/435 |
| 2009/0024256 | A1 | * | 1/2009 | Adams ............... G05D 23/1919 700/300 |

(Continued)

FOREIGN PATENT DOCUMENTS

| | | | | |
|---|---|---|---|---|
| CN | 102255343 A | | 11/2011 | |
| EP | 1174976 A1 | * | 1/2002 | .............. H02J 7/342 |

(Continued)

OTHER PUBLICATIONS

Notification of First Office Action for Chinese Application No. 2016108353833 dated Aug. 31, 2020.

*Primary Examiner* — Richard Isla
*Assistant Examiner* — Dung V Bui
(74) *Attorney, Agent, or Firm* — David B. Kelley; Carlson, Gaskey & Olds

(57) ABSTRACT

A vehicle charging station according to an exemplary aspect of the present disclosure includes, among other things, a cooling system configured to communicate a cooling airflow to a portion of a thermal management system located onboard an electrified vehicle, the cooling system including a fan and a chiller assembly.

19 Claims, 2 Drawing Sheets

(56) References Cited

U.S. PATENT DOCUMENTS

| | | | |
|---|---|---|---|
| 2009/0246596 A1* | 10/2009 | Sridhar | B60L 53/54 429/513 |
| 2010/0057259 A1* | 3/2010 | Dawson | G05B 15/02 700/278 |
| 2011/0072841 A1* | 3/2011 | Arai | B60H 1/00278 62/259.2 |
| 2011/0277967 A1* | 11/2011 | Fried | F28D 15/04 165/104.26 |
| 2012/0041855 A1 | 2/2012 | Sterling et al. | |
| 2012/0085512 A1* | 4/2012 | Graaf | H01M 10/625 165/51 |
| 2012/0222438 A1* | 9/2012 | Osaka | B60L 58/26 62/126 |
| 2012/0247715 A1* | 10/2012 | Renner | B60H 1/00385 165/42 |
| 2012/0291987 A1* | 11/2012 | Himmer | B60H 1/00278 165/42 |
| 2013/0069588 A1 | 3/2013 | Oda et al. | |
| 2013/0192281 A1* | 8/2013 | Nam | B60H 1/3201 62/101 |
| 2013/0241490 A1* | 9/2013 | Kim | B60L 58/27 320/112 |
| 2014/0012447 A1* | 1/2014 | Gao | B60L 11/1874 701/22 |
| 2014/0266042 A1 | 9/2014 | Storm | |
| 2014/0277869 A1* | 9/2014 | King | B60L 58/26 701/22 |
| 2014/0292260 A1* | 10/2014 | Dyer | H02J 7/0029 320/107 |
| 2014/0316630 A1* | 10/2014 | Kohlberger | B60L 53/305 701/22 |
| 2014/0338376 A1* | 11/2014 | Carpenter | B60L 58/27 62/115 |
| 2014/0371936 A1* | 12/2014 | Kamel | G01R 21/1333 700/291 |
| 2015/0054460 A1* | 2/2015 | Epstein | B60L 58/24 320/109 |
| 2015/0211412 A1* | 7/2015 | Presetschnik | B60L 1/02 123/41.1 |

FOREIGN PATENT DOCUMENTS

| | | | |
|---|---|---|---|
| EP | 2301777 B1 | | 4/2015 |
| ES | 1077439 U | * | 7/2012 |

* cited by examiner

CHARGING STATION FOR ELECTRIFIED VEHICLES

TECHNICAL FIELD

This disclosure relates to a vehicle charging station for charging a battery pack of an electrified vehicle. The charging station includes a cooling system configured to communicate cooling airflow toward the electrified vehicle to augment battery pack cooling during certain conditions.

BACKGROUND

The need to reduce automotive fuel consumption and emissions is well known. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to drive the vehicle.

A high voltage battery pack typically powers the electric machines and other electrical loads of the electrified vehicle. The battery pack includes a plurality of battery cells that must be periodically recharged to replenish the energy necessary to power these loads. An infrastructure of easily accessible charging stations is needed for charging the battery packs of electrified vehicles.

SUMMARY

A vehicle charging station according to an exemplary aspect of the present disclosure includes, among other things, a cooling system configured to communicate a cooling airflow to a portion of a thermal management system located onboard an electrified vehicle, the cooling system including a fan and a chiller assembly.

In a further non-limiting embodiment of the foregoing vehicle charging station, the cooling system is housed inside a housing of the vehicle charging station.

In a further non-limiting embodiment of either of the foregoing vehicle charging stations, the housing includes a vent and the cooling airflow is communicated through the vent to a location external to the housing.

In a further non-limiting embodiment of any of the foregoing vehicle charging stations, the chiller assembly includes a heat exchanger, and the fan is configured to communicate airflow across the heat exchanger to generate the cooling airflow.

In a further non-limiting embodiment of any of the foregoing vehicle charging stations, the chiller assembly includes a compressor, a first heat exchanger, an expansion valve and a second heat exchanger.

In a further non-limiting embodiment of any of the foregoing vehicle charging stations, the first heat exchanger is a condenser and the second heat exchanger is an evaporator.

In a further non-limiting embodiment of any of the foregoing vehicle charging stations, a controller is configured to control operation of the cooling system.

In a further non-limiting embodiment of any of the foregoing vehicle charging stations, the controller is configured to command operation of the cooling system during DC fast charging events.

In a further non-limiting embodiment of any of the foregoing vehicle charging stations, a charging cord extends to a location outside of a housing of the vehicle charging station.

In a further non-limiting embodiment of any of the foregoing vehicle charging stations, the cooling system is powered by an external power source.

A method according to another exemplary aspect of the present disclosure includes, among other things, augmenting cooling of a battery pack of an electrified vehicle during a DC fast charging event. The step of augmenting cooling includes communicating a cooling airflow from a cooling system of a charging station across a component of a thermal management system of the electrified vehicle.

In a further non-limiting embodiment of the foregoing method, the component of the thermal management system includes a cooling pack.

In a further non-limiting embodiment of either of the foregoing methods, the cooling pack includes a radiator, a condenser, or both.

In a further non-limiting embodiment of any of the foregoing methods, the method includes communicating the cooling airflow through a vent of a housing of the charging station.

In a further non-limiting embodiment of any of the foregoing methods, the method includes communicating the cooling airflow if a charging cord of the charging station is plugged into a charging port of the electrified vehicle.

In a further non-limiting embodiment of any of the foregoing methods, the method includes continuing to communicate the cooling airflow after the DC fast charge event has ended.

In a further non-limiting embodiment of any of the foregoing methods, the cooling system includes a fan and a chiller assembly.

In a further non-limiting embodiment of any of the foregoing methods, the chiller assembly includes a compressor, a first heat exchanger, an expansion valve and a second heat exchanger.

In a further non-limiting embodiment of any of the foregoing methods, the method includes blowing airflow across a heat exchanger of the cooling system to generate the cooling airflow.

In a further non-limiting embodiment of any of the foregoing methods, the airflow loses heat to a coolant circulated inside the heat exchanger as the airflow is communicated across the heat exchanger.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes a vehicle charging station for charging an energy storage device (e.g., a battery pack) of an electrified vehicle. The vehicle charging station includes a cooling system configured to communicate cooling airflow toward an electrified vehicle connected to the vehicle charging station to augment battery pack cooling, such as during DC fast charging events. The cooling system may include a chiller assembly and a fan for generating and communicating the cooling airflow. These and other features are discussed in greater detail in the following paragraphs of this detailed description.

Figure 1:
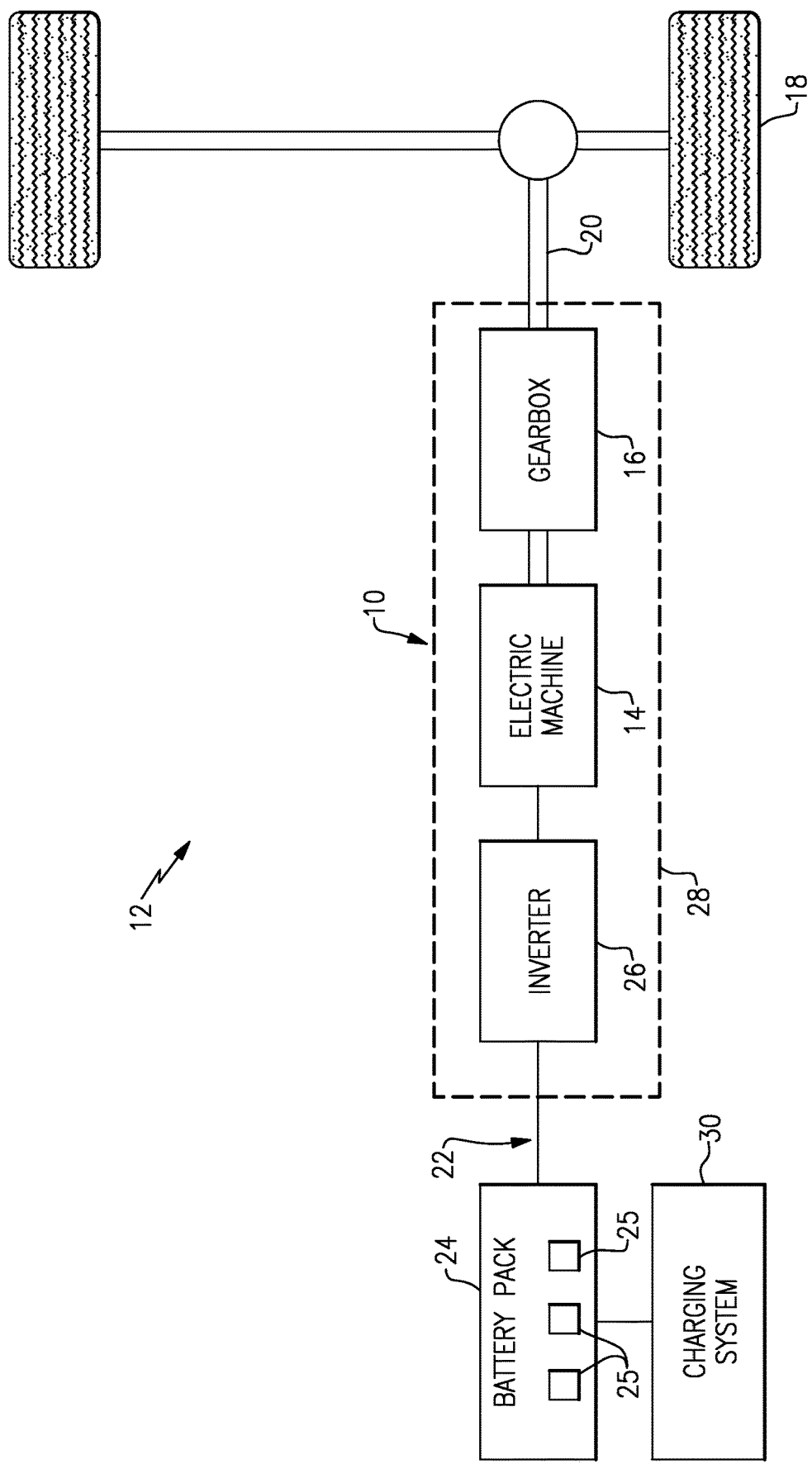
FIG. 1 schematically illustrates a powertrain of an electrified vehicle.

FIG. 1 schematically illustrates a powertrain 10 of an electrified vehicle 12. Although depicted as a battery electric vehicle (BEV), it should be understood that the concepts described herein are not limited to BEV's and could extend to other electrified vehicles, including but not limited to, plug-in hybrid electric vehicles (PHEV's). Therefore, although not shown in this embodiment, the electrified vehicle 12 could be equipped with an internal combustion engine that can be employed either alone or in combination with other energy sources to propel the electrified vehicle 12.

In one non-limiting embodiment, the electrified vehicle 12 is a full electric vehicle propelled solely through electric power, such as by an electric machine 14, without assistance from an internal combustion engine. The electric machine 14 may operate as an electric motor, an electric generator, or both. The electric machine 14 receives electrical power and provides a rotational output power. The electric machine 14 may be connected to a gearbox 16 for adjusting the output torque and speed of the electric machine 14 by a predetermined gear ratio. The gearbox 16 is connected to a set of drive wheels 18 by an output shaft 20. A high voltage bus 22 electrically connects the electric machine 14 to a battery pack 24 through an inverter 26. The electric machine 14, the gearbox 16, and the inverter 26 are collectively referred to as a transmission 28.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The electrified vehicle 12 may also include a charging system 30 for charging the energy storage devices (e.g., battery cells) of the battery pack 24. The charging system 30 may be connected to an external power source (not shown) for receiving and distributing power. The charging system 30 may also be equipped with power electronics used to convert AC power received from the external power supply to DC power for charging the energy storage devices of the battery pack 24. The charging system 30 may also accommodate one or more conventional voltage sources from the external power supply (e.g., 110 volt, 220 volt, etc.).

The powertrain 10 shown in FIG. 1 is highly schematic and is not intended to limit this disclosure. Various additional components could alternatively or additionally be employed by the powertrain 10 within the scope of this disclosure.

Figure 2:
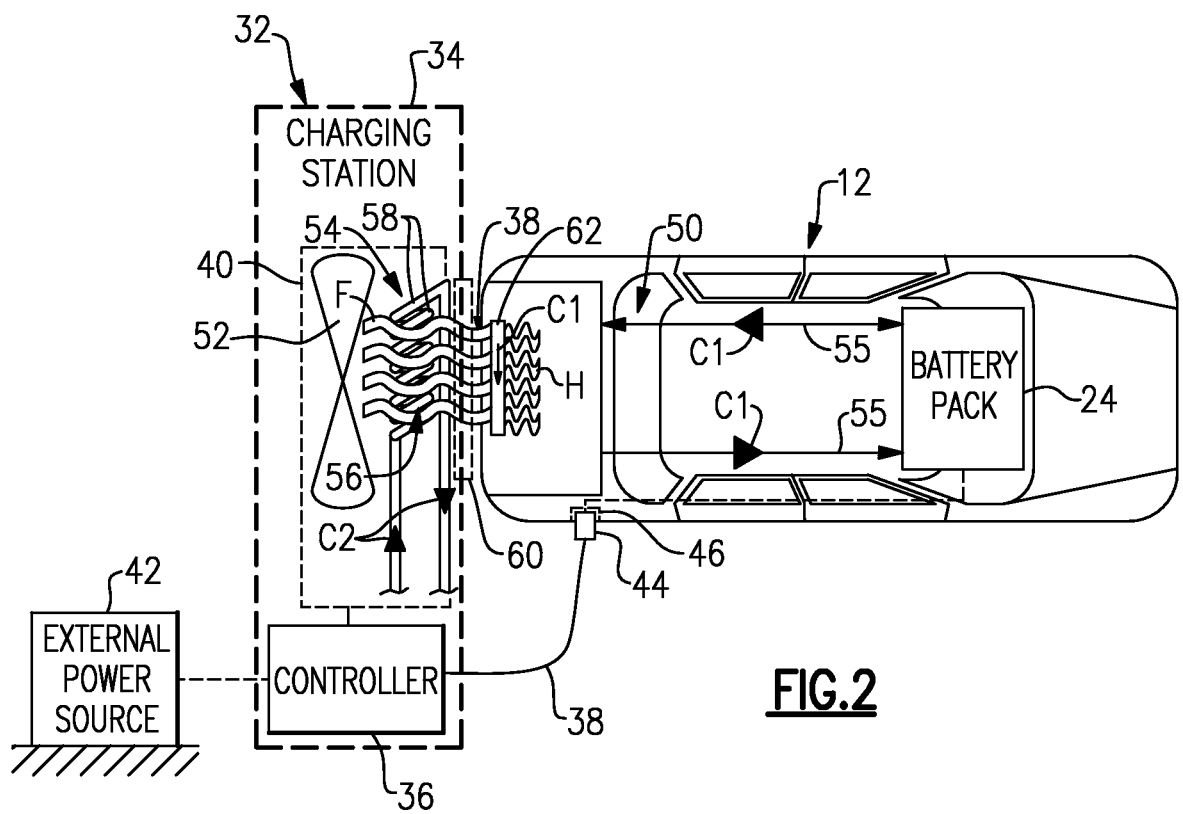
FIG. 2 illustrates a vehicle charging station for charging a battery pack of an electrified vehicle.

FIG. 2 is a highly schematic depiction of a vehicle charging station 32 that may be employed to charge an energy storage device, such as the battery pack 24 of electrified vehicle 12. The electrified vehicle 12 is shown parked in proximity to the vehicle charging station 32. The various components of the vehicle charging station 32 and the electrified vehicle 12 are shown schematically to better illustrate the features of this disclosure and are not necessarily depicted in their exact locations and configurations within the vehicle charging station 32 and the electrified vehicle 12, respectively. It should further be understood that the components depicted in FIG. 2 are not necessarily drawn to scale.

The vehicle charging station 32 may be connected to the electrified vehicle 12 to charge the battery pack 24. In one non-limiting embodiment, the vehicle charging station 32 is configured to perform DC fast charging of the battery pack 24. DC fast charging events are immediate, rapid charge events that typically last approximately thirty minutes or less. The vehicle charging station 32 may employ DC fast charging by delivering direct current at power rates between approximately 50 A and 500 A at between 200 V and 600 V to rapidly charge the battery pack 24, as opposed to the typical 4 A to 15 A output of standard alternating current chargers.

The vehicle charging station 32, including its various components, may be powered by an external power source 42 (shown schematically). In one non-limiting embodiment, the external power source 42 is utility grid power. In another non-limiting embodiment, the external power source 42 includes an alternative energy source, such as solar power, wind power, etc. In yet another non-limiting embodiment, the external power source 42 includes a combination of utility grid power and alternative energy sources.

The exemplary vehicle charging station 32 may include a housing 34, a controller 36, a charging cord 38 and a cooling system 40. The controller 36 and the cooling system 40 are housed inside the housing 34, whereas the charging cord 38 may extend outside of the housing 34 for connecting to the electrified vehicle 12. Although not shown, the housing 34 could include one or more output displays for displaying information to an occupant of the electrified vehicle 12.

The controller 36 is configured to control the amount of charge supplied from the vehicle charging station 32 to the battery pack 24, such as during a DC fast charging event. For example, the controller 36 may control the amount of voltage and current that is supplied during the DC fast charging event as well as the length of the charge, among other parameters. The controller 36 may also communicate with the various control systems of the electrified vehicle 12 for monitoring or otherwise controlling the DC fast charging event.

The controller 36 may be equipped with various power electronics for controlling the charging-related tasks. For example, in one non-limiting embodiment, the controller 36 converts alternating current (AC) received from the external power source 42 to direct current (DC) for DC fast charging the battery pack 24. In yet another non-limiting embodiment, as is discussed in greater detail below, the controller 36 may additionally control operation of the cooling system 40 for selectively directing cooling airflow 48 toward the electrified vehicle 12 during DC fast charging events.

The charging cord 38 of the vehicle charging station 32 includes a plug 44, or connector, configured to connect to a charging port 46 of the electrified vehicle 12. Current originating from the external power source 42 may be transferred from the vehicle charging station 32 to the electrified vehicle 12 for charging the battery pack 24 via the charging cord 38.

A relatively significant amount of heat may be generated in the battery pack 24 as a result of the charge rates supplied during DC fast charging events and due to the internal resistances of the battery cells of the battery pack 24. The electrified vehicle 12 is therefore equipped with a thermal management system 50 for managing this heat during charging events. The thermal management system 50 may be a closed-loop cooling system that circulates a coolant C1 through a portion of the battery pack 24 to remove heat. The coolant C1 may be any type of coolant, including but not limited to a gas such as air or a liquid such as water mixed with ethylene glycol. The thermal management system 50 may include various conduits or passages 55 for communicating the coolant C1 to and from the battery pack 24.

The thermal management system 50 may have an insufficient capacity to effectively cool the battery pack 24 during DC fast charging events. In such instances, the cooling system 40 of the vehicle charging station 32 can be employed to augment the cooling of the battery pack 24. In one non-limiting embodiment, the cooling system 40 communicates cooling airflow 48 to a location outside of the housing 34 of the vehicle charging station 32 during DC fast charging events in order to augment the thermal management of the battery pack 24.

In one non-limiting embodiment, the cooling system 40 of the vehicle charging station 32 includes a fan 52 and a chiller assembly 54. A coolant C2 may be circulated through a heat exchanger 56 of the chiller assembly 54. The coolant C2 exchanges heat with an airflow F that is communicated across the heat exchanger 56 by the fan 52. The airflow F is cooled (i.e., loses heat to the coolant C2) as it is blown across a plurality of fins or coils 58 of the heat exchanger 56 to generate the cooling airflow 48. The cooling airflow 48 may then be communicated through a vent 60 of the housing 34 toward the electrified vehicle 12 to aid the thermal management system 50 in cooling the battery pack 24.

The cooling airflow 48 that is communicated from the vehicle charging station 32 may be directed across a portion of the thermal management system 50 to augment the thermal management of the battery pack 24. For example, in one non-limiting embodiment, the cooling airflow 48 is directed across a cooling pack 62 of the thermal management system 50. The cooling pack 62 may include a radiator, a condenser, or both, as well as other components. In one non-limiting embodiment, the cooling pack 62 is mounted near a front end of the electrified vehicle 12 and is in close proximity to the vehicle charging station 32 once the charging cord 38 is plugged into the charging port 46 of the electrified vehicle 12.

The cooling airflow 48 picks up heat H from the coolant C1 that is circulated through the closed loop of the thermal management system 50 as the cooling airflow 48 is communicated across the cooling pack 62. Stated another way, additional heat H from the coolant C1 is lost to the cooling airflow 48 as the coolant C1 is communicated inside the cooling pack 62. Cooling of the battery pack 24 is therefore augmented by the cooling system 40 of the vehicle charging station 32.

The controller 36 of the vehicle charging station 32 is configured to control operation of the cooling system 40 for selectively providing the cooling airflow 48. In one non-limiting embodiment, the controller 36 may command operation of the cooling system 40 during each DC fast charging event. In another non-limiting embodiment, the controller 36 may command operation of the cooling system 40 each time the charging cord 38 is plugged into a charging port 46 of an electrified vehicle 12. In yet another non-limiting embodiment, the controller 36 may command continued operation of the cooling system 40 even after a DC fast charging event has ended in order to continue to chill the battery pack 24 during relatively extreme ambient conditions (e.g., when an ambient temperature exceeds a predefined threshold temperature stored in the memory of the controller 36).

Figure 3:
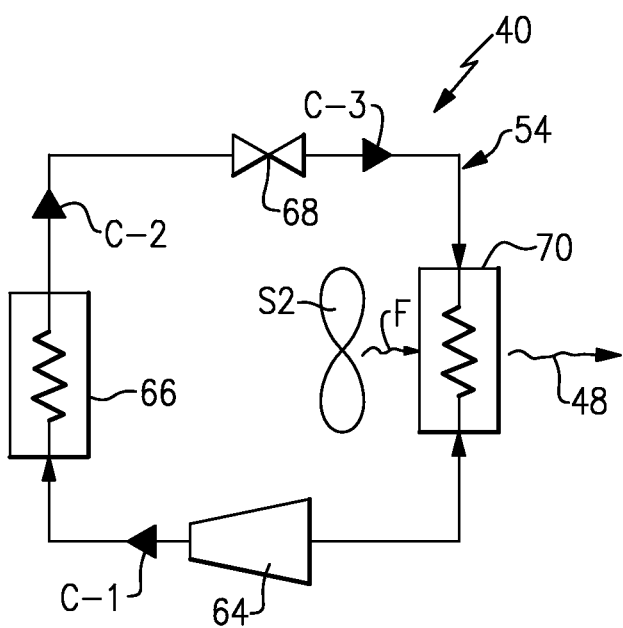
FIG. 3 illustrates an exemplary cooling system of a vehicle charging station.

FIG. 3 illustrates an exemplary cooling system 40 that could be employed for use within the vehicle charging station 32 described above. The cooling system 40 may include a chiller assembly 54 that includes a compressor 64, a first heat exchanger 66 (e.g., a condenser), an expansion valve 68, a second heat exchanger 70 (e.g., an evaporator) and a fan 52. During operation of the cooling system 40, the compressor 64 pressurizes and circulates a coolant in a first phase C-1 (i.e., a vapor) through a closed loop 74 of the cooling system 40. The compressor 64 may be electrically powered using power from the external power source 42 (schematically depicted in FIG. 2). The compressor 64 directs the high pressure coolant to the first heat exchanger 66.

The high pressure coolant may next exchange heat with another fluid, such as airflow, within the first heat exchanger 66. The first heat exchanger 66, which may be a condenser, transfers heat to the surrounding environment by condensing the coolant from a vapor to a liquid coolant having a second phase C2.

The liquid coolant exiting the first heat exchanger 66 may be communicated to the expansion valve 68, which reduces the pressure of the coolant and results in the evaporation of a portion of the liquid coolant to a combination of a liquid and vapor coolant having a third phase C-3. The temperature of the liquid and vapor coolant mixture is colder than the temperature of the liquid coolant.

The liquid and vapor coolant mixture exiting the expansion valve 68 is next communicated to the second heat exchanger 70, which may be configured as an evaporator. Within the second heat exchanger 70, heat is transferred between the surrounding environment and the liquid and vapor coolant mixture, thereby causing the coolant mixture to completely vaporize. The fan 52 of the cooling system 40 may communicate airflow F across the second heat exchanger 70, and as this occurs, the airflow F loses heat to the coolant to generate the cooling airflow 48.

The cooling system 40 shown and described with reference to FIGS. 2 and 3 is but one non-limiting embodiment of the type of cooling system that may be employed inside the vehicle charging station 32. Other cooling system configurations may alternatively or additionally be utilized to direct cooling airflow 48 toward the electrified vehicle 12 during DC fast charging events or during other conditions.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle charging station, comprising:
 a cooling system including a chiller assembly and a fan arranged to blow an airflow across said chiller assembly to generate a cooling airflow and then direct said cooling airflow toward a portion of a thermal management system located onboard an electrified vehicle,
 wherein said cooling system is housed inside a housing of said vehicle charging station,
 wherein said housing includes a vent and said cooling airflow is communicated through said vent to a location external to said housing.

2. The vehicle charging station as recited in claim 1, wherein said chiller assembly includes a heat exchanger, and said fan is configured to communicate said airflow across said heat exchanger to generate said cooling airflow.

3. The vehicle charging station as recited in claim 1, wherein said chiller assembly includes a compressor, a first heat exchanger, an expansion valve and a second heat exchanger.

4. The vehicle charging station as recited in claim 3, wherein said first heat exchanger is a condenser and said second heat exchanger is an evaporator.

5. The vehicle charging station as recited in claim 1, comprising a controller configured to control operation of said cooling system.

6. The vehicle charging station as recited in claim 5, wherein said controller is configured to command operation of said cooling system during DC fast charging events.

7. The vehicle charging station as recited in claim 1, comprising a charging cord that extends to a location outside of said housing of said vehicle charging station.

8. The vehicle charging station as recited in claim 1, wherein said cooling system is powered by an external power source.

9. A method, comprising:
 augmenting cooling of a battery pack of an electrified vehicle during a DC fast charging event, the step of augmenting cooling including communicating a cooling airflow from a cooling system of a charging station through a vent of a housing of the charging station and then across a component of a thermal management system of the electrified vehicle.

10. The method as recited in claim 9, wherein the component of the thermal management system includes a cooling pack.

11. The method as recited in claim 10, wherein the cooling pack includes a radiator, a condenser, or both.

12. The method as recited in claim 9, comprising communicating the cooling airflow if a charging cord of the charging station is plugged into a charging port of the electrified vehicle.

13. The method as recited in claim 9, comprising continuing to communicate the cooling airflow after the DC fast charge event has ended.

14. The method as recited in claim 9, wherein the cooling system includes a fan and a chiller assembly.

15. The method as recited in claim 14, wherein the chiller assembly includes a compressor, a first heat exchanger, an expansion valve and a second heat exchanger.

16. The method as recited in claim 9, comprising blowing airflow across a heat exchanger of the cooling system to generate the cooling airflow.

17. The method as recited in claim 16, wherein the airflow loses heat to a coolant circulated inside the heat exchanger as the airflow is communicated across the heat exchanger.

18. A vehicle charging station for charging an electrified vehicle, comprising:
 a housing including a vent; and
 a cooling system housed inside the housing and including a chiller assembly and a fan arranged to blow an airflow across a heat exchanger of the chiller assembly to generate a cooling airflow and then direct the cooling airflow through the vent to cool a portion of a thermal management system located onboard the electrified vehicle when the electrified vehicle is parked near the vehicle charging station;
 wherein the housing is separate from the electrified vehicle being charged by the vehicle charging station.

19. The vehicle charging station as recited in claim 18, wherein the chiller assembly is arranged axially between the fan and the vent.

* * * * *